(12) United States Patent
Mitra et al.

(10) Patent No.: US 10,319,124 B2
(45) Date of Patent: *Jun. 11, 2019

(54) REQUEST RESOLUTION SHAPER IN A NETWORKED SYSTEM ARCHITECTURE

(71) Applicant: ServiceNow, Inc., Santa Clara, CA (US)

(72) Inventors: Abhijit Mitra, Saratoga, CA (US);
Mohan Konyala, San Jose, CA (US);
Rampradeep Dodda, San Jose, CA (US)

(73) Assignee: SERVICENOW, INC., Santa Clara, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/597,935

(22) Filed: May 17, 2017

(65) Prior Publication Data
US 2017/0287180 A1  Oct. 5, 2017

Related U.S. Application Data

(63) Continuation of application No. 15/086,728, filed on Mar. 31, 2016, now Pat. No. 9,659,391.

(51) Int. Cl.
*G06F 3/14* (2006.01)
*G06Q 10/06* (2012.01)
(Continued)

(52) U.S. Cl.
CPC ........ *G06T 11/206* (2013.01); *G06F 3/04817* (2013.01); *G06F 3/04845* (2013.01); *G06F 3/14* (2013.01); *G06Q 10/0633* (2013.01)

(58) Field of Classification Search
None
See application file for complete search history.

(56) References Cited

U.S. PATENT DOCUMENTS

2005/0246119 A1  11/2005  Koodali
2006/0229931 A1  10/2006  Fligler et al.
(Continued)

OTHER PUBLICATIONS

KVR Audio Forum, "What do you think of sonar X2", downloaded Jan. 13, 2016, http://www.kvraudio.com/forum/viewtopic.php?p=5492838, 13 pp.

*Primary Examiner* — Frank S Chen
(74) *Attorney, Agent, or Firm* — Fletcher Yoder PC

(57) ABSTRACT

An apparatus and related method are provided for generating a graphical display region for display of a plurality of pixels of a display device, comprising generating a timeline axis for display in the graphical display region, receiving requester event data for a plurality of requester events from a requester device relating to a request and storing the requester event data, including a time of occurrence for each requester event, and fulfiller event data for fulfiller events from a fulfiller device and storing the fulfiller event data, calculating a time scale for the timeline axis such that requester events and fulfiller events are displayable at a position along the timeline axis proportional to their respective time of occurrence, and a respective axial position for requester indicia representing the requester events and fulfiller indicia representing the fulfiller events at a position along the timeline axis proportional to their respective time of occurrence.

22 Claims, 5 Drawing Sheets

(51) Int. Cl.
*G06T 11/20* (2006.01)
*G06F 3/0481* (2013.01)
*G06F 3/0484* (2013.01)

(56) References Cited

U.S. PATENT DOCUMENTS

| | | |
|---|---|---|
| 2009/0232739 A1 | 9/2009 | Cheng et al. |
| 2010/0268568 A1 | 10/2010 | Ochs et al. |
| 2013/0124605 A1* | 5/2013 | Klaka .................... G06Q 10/10 709/203 |
| 2014/0229391 A1 | 8/2014 | East, III et al. |
| 2014/0324797 A1 | 10/2014 | Yung et al. |
| 2015/0046856 A1* | 2/2015 | Rucker ............... G06F 3/04883 715/765 |
| 2015/0229981 A1 | 8/2015 | Williams et al. |
| 2015/0370877 A1 | 12/2015 | Bandera et al. |
| 2015/0379011 A1 | 12/2015 | Neyyan et al. |
| 2017/0160917 A1* | 6/2017 | Krikke .................. G06F 3/1203 |

\* cited by examiner

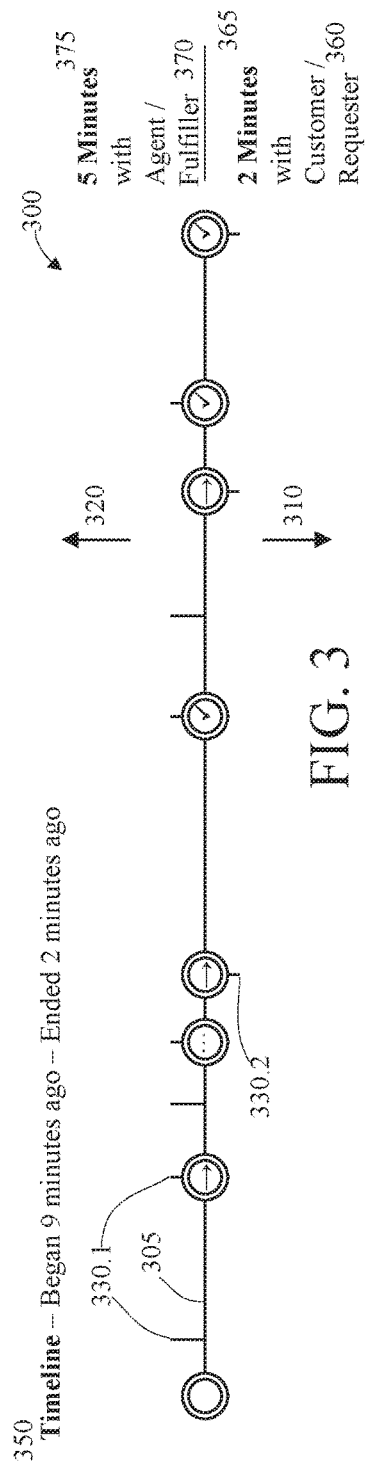
FIG. 3
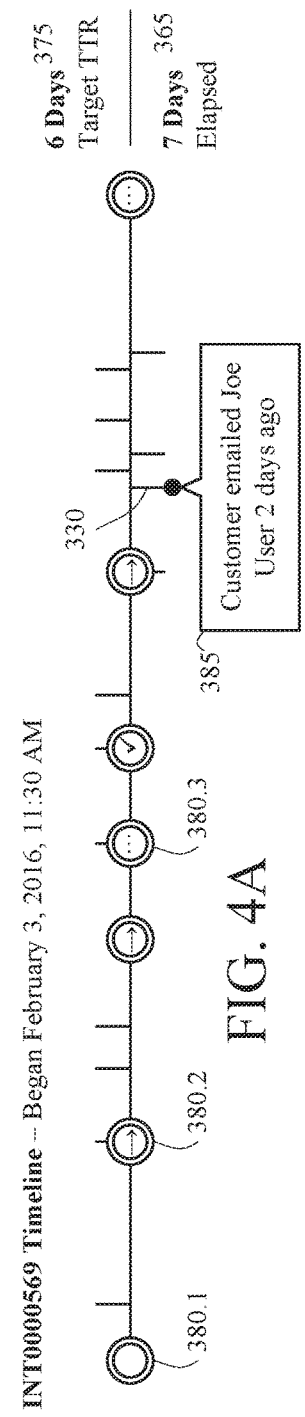
FIG. 4A
FIG. 4B
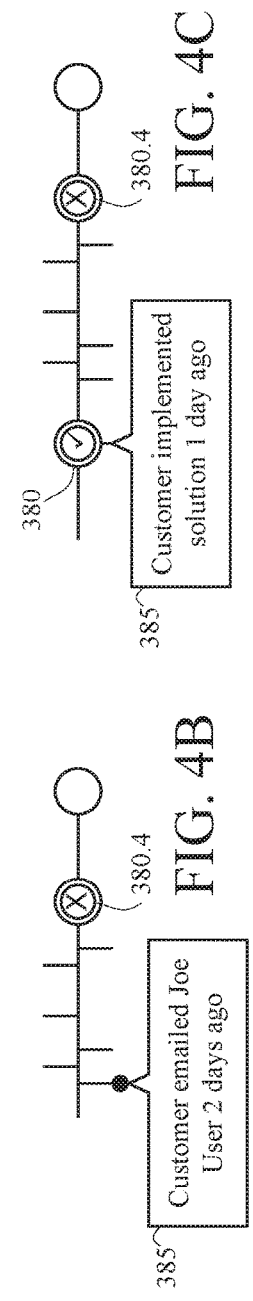
FIG. 4C

REQUEST RESOLUTION SHAPER IN A NETWORKED SYSTEM ARCHITECTURE

CROSS REFERENCE TO RELATED APPLICATIONS

This application is a continuation of U.S. application Ser. No. 15/086,728, filed on Mar. 31, 2016, the contents of which are herein expressly incorporated by reference for all purposes.

TECHNICAL FIELD

The present disclosure relates in general to a request resolution shaper in a networked system architecture, and in particular to techniques and devices for understanding and resolving problems that arise or requests that are presented in a computer networked system or cloud-based architecture.

BACKGROUND

Presenting requests or resolving problems in a network computer system can be quite complex at times and involve conveying voluminous amounts of information in a finite area of a computer display screen.

SUMMARY

According to an implementation of the invention, an apparatus is provided for generating a graphical display region for display of a plurality of pixels of a display device for a timeline display, comprising a processor, a network interface comprising a communications port connected to a network, a memory accessible by the processor and comprising a timeline display module that comprises instructions executable by the processor, wherein the timeline display module comprises instructions that generate a timeline axis for display in the graphical display region, wherein the timeline axis spans a predefined axis length within the display region, receive, at the network interface requester event data for a plurality of requester events from a requester device relating to a request and storing the requester event data, including a time of occurrence for each requester event, in the memory, and fulfiller event data for a plurality of fulfiller events from a fulfiller device and storing the fulfiller event data, including a time of occurrence for each fulfiller event, in the memory, calculate, with the processor a time scale for the timeline axis such that requester events and fulfiller events are displayable on the timeline axis at a position along the timeline axis proportional to their respective time of occurrence, and a respective axial position for requester indicia representing the requester events and fulfiller indicia representing the fulfiller events at a position along the timeline axis proportional to their respective time of occurrence, generate, on a requester side of the timeline axis in the display region, the requester indicia, generate, on a fulfiller side of the timeline axis in the display region, the fulfiller indicia, such that a position of the requester indicia is visually distinguishable from a position of the fulfiller indicia in a direction perpendicular to the timeline axis, and generate, on the timeline axis in the display region, state indicia of the request.

According to another implementation, a method is provided for generating a graphical display region for display of a plurality of pixels of a display device, comprising generating a timeline axis for display in the graphical display region, wherein the timeline axis spans a predefined axis length within the display region, receiving, at a network interface of a server computer requester event data for a plurality of requester events from a requester device relating to a request and storing the requester event data, including a time of occurrence for each requester event, in a memory, and fulfiller event data for a plurality of fulfiller events from a fulfiller device and storing the fulfiller event data, including a time of occurrence for each fulfiller event, in the memory, calculating, with a processor a time scale for the timeline axis such that requester events and fulfiller events are displayable on the timeline axis at a position along the timeline axis proportional to their respective time of occurrence, and a respective axial position for requester indicia representing the requester events and fulfiller indicia representing the fulfiller events at a position along the timeline axis proportional to their respective time of occurrence, generating, on a requester side of the timeline axis in the display region, the requester indicia, generating, on a fulfiller side of the timeline axis in the display region, the fulfiller indicia, such that a position of the requester indicia is visually distinguishable from a position of the fulfiller indicia in a direction perpendicular to the timeline axis, and generating, on the timeline axis in the display region, state indicia of the request.

According to a further implementation, a non-transitory computer-readable storage medium is provided, comprising executable instructions that, when executed by a processor, facilitate performance of operations for reducing a security risk in a networked computer system architecture, according to the method described above.

BRIEF DESCRIPTION OF THE DRAWINGS

The description herein makes reference to the accompanying drawings wherein like reference numerals refer to like parts throughout the several views.

FIG. 3 is an implementation of a timeline diagram mapping a request and resolution.

FIG. 4A is an implementation of a timeline diagram shown on a display device mapping an open request.

FIG. 4B is an implementation of a timeline diagram shown on a display device mapping a closed request with a popover window on a tick mark.

FIG. 4C is an implementation of a timeline diagram shown on a display device mapping a closed request with a popover window on a state indicator.

DETAILED DESCRIPTION

Figure 1:
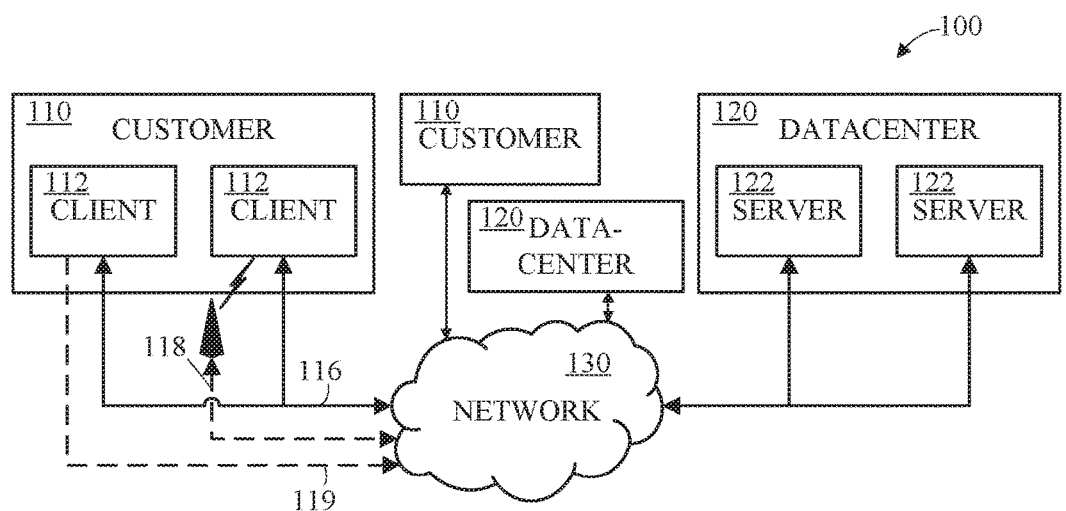
FIG. 1 is a block diagram of a networked distributed or cloud computing system used by an implementation of this disclosure.

In complex network computer systems, such as cloud-based architectures or client-server models, resolving technical problems or providing requests can be complex and difficult. For example, the fault that caused a request may be with any of the computers involved in the system or the network infrastructure tying the computers together. Resolving a request may require a broad understanding of these computers and/or network infrastructure which may require multiple individuals to resolve.

Furthermore, providing large volumes of information within the limits of a graphical display without the display becoming cluttered and confusing can be challenging, and prior efforts to do so in the computer system problem resolution space have not been optimal.

Providing graphical updates on a computer display device to assist in rapid diagnosing and present responsive and comprehensive status updates to requests and problems in networked computer systems in a concise manner has been a goal of system response teams. As a request progresses through multiple communication channels (such as email, phone, chat, web, social media, etc.) between a requestor (one making a request) and a fulfiller (one ultimately responsible for fulfilling the request), keeping track of all the communication over time gets complex. There is a need for simplified and concise visual representation on a display device for faster and more accurate decision-making.

Implementations of the present disclosure provide a resolution-based system and method that achieves this goal in an efficient and effective manner. The system predicts the completion of a request and key metrics (e.g. service level agreements (SLAs), downtime, costs) that are or may be breached.

Specifically, the request resolution shaper involves a method and device for producing a graphic visualization on a display device that represents a snapshot of a problem/ request progression, current request state in terms of key metrics like service level agreement (SLA) status (e.g., whether an SLA is breached or is projected to be breached), and how close request completion is. For purposes of discussion below, a "request" can be a request to resolve a problem or a request for hardware, software, or any type of product or service.

The request resolution shaper may be provided as a part of an integrated platform to represent various activities related to the request on a timeline. This timeline gives a chronological view of the request progression along with the activities and conversations that happened or are happening to accomplish it. It provides a way to compactly present information so that users are able to quickly understand and decide if an intervention or an escalation is required. States on the timeline can also convey a quality of interaction between the requestor and fulfiller.

These implementations of the invention are discussed in more detail below, after a discussion of a general structure of a computer network and cloud computing, as well as a general structure of a computer within this network, on which the implementations may be run.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system comprising multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points (e.g., a wireless connection point 118 and a wired connection point 119). Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2A:
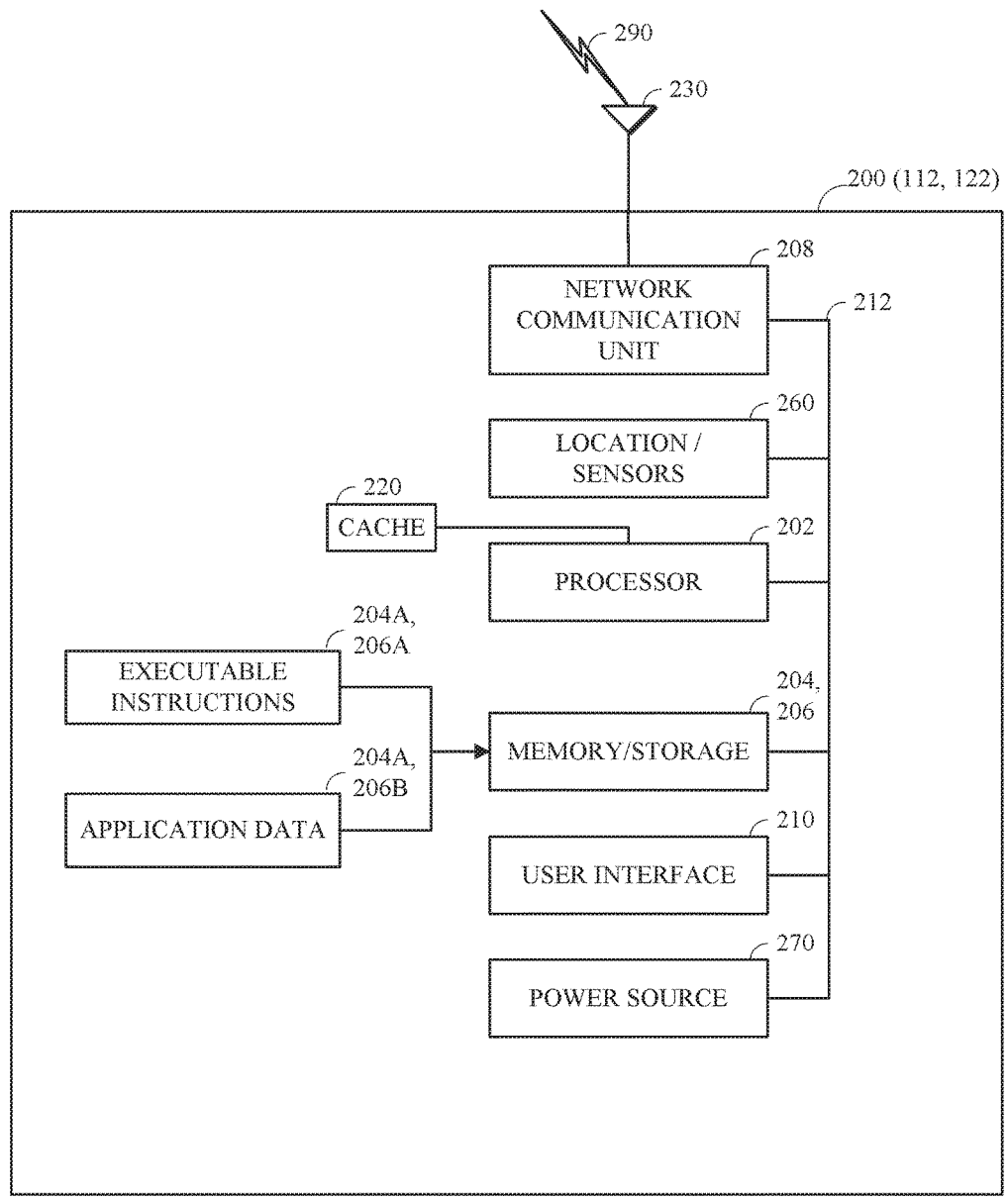
FIG. 2A is a block diagram of an implementation of an internal configuration of a computing device, such as a computing device of the computing system as shown in FIG. 1.

FIG. 2A is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can comprise a number of components, as illustrated in FIG. 2A. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general-purpose processor or a special-purpose processor.

Random Access Memory (RAM 204) can be any suitable non-permanent storage device that is used as memory. RAM 204 can include executable instructions and data for immediate access by CPU 202. RAM 204 typically includes one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid-state drive, flash memory, Phase-Change Memory (PCM), or any form of non-volatile memory designed to maintain data for some duration of time, and preferably in the event of a power loss. A disk device, as defined herein, can be an actual disk drive or other forms of storage devices designed to be accessed in a manner similar to an actual disk drive (e.g., flash cards and solid-state disk drives, and the like). Storage 206 can comprise executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 comprises instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can include one or more transceiver(s) that utilize the Ethernet, power line communication (PLC), WiFi, infrared, GPRS/GSM, CDMA, etc.

A user interface can be broken down into the hardware user interface portion and the software user interface portion. A hardware user interface (e.g., display 210) can include a display, positional input device (such as a mouse, touchpad, touchscreen, or the like), keyboard, or other forms of user input and output devices and hardware. The hardware user interface can be coupled to the processor 202 via the bus 212. Other output devices that permit a user to program or otherwise use the client or server can be provided in addition to or as an alternative to display 210. When the output device is or comprises a hardware display, this display can be implemented in various ways, including by a liquid crystal display (LCD) or a cathode-ray tube (CRT) or light emitting diode (LED) display, such as an OLED display.

The software graphical user interface constitutes programs and data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display. that can be used to generate pixel information. A structured data output of one device can be provided to an input of the hardware display so that the elements provided on the hardware display screen represent the underlying structure of the output data.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 2B:
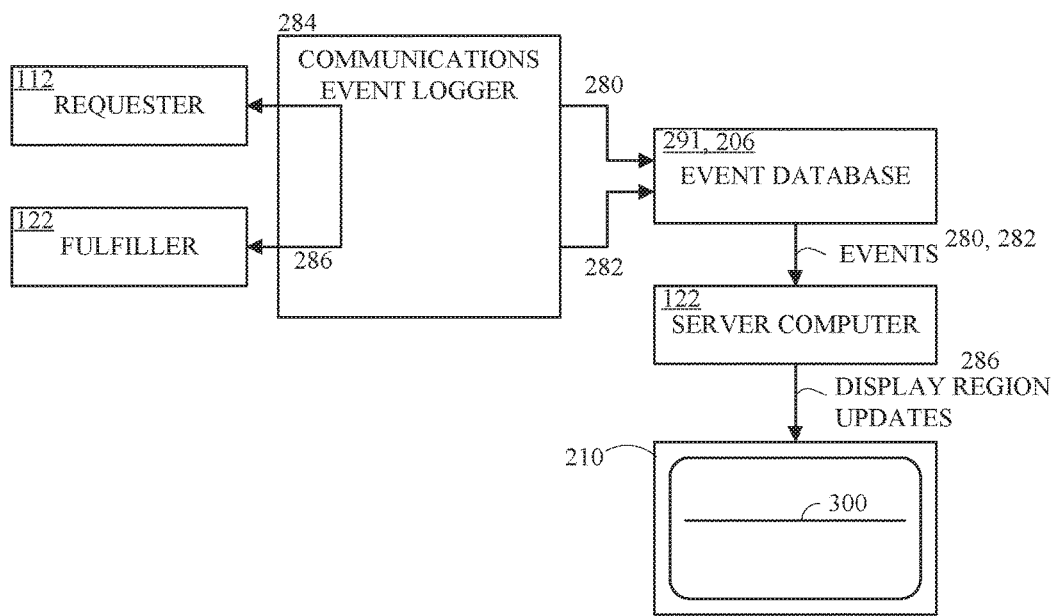
FIG. 2B is a block diagram showing an implementation of a system used for the timeline display.

As noted above, various implementations of the invention may be run on the computing devices 200 described above and within the context of a networked computing system 100. FIG. 2B is a block diagram showing an example system used for the timeline display. A client 112 or requester, illustrated as a computer, but could also be an individual using a telephone, etc. to make requests, and a server 122 (i.e., fulfiller) both communicate with each other 286 via email, phone, chat, web, social media, or other communications channel. Any viable communication channel or mechanism may be utilized. A communications event logger 284 has access to the communications 286 and the sent events 280, 282 associated with a requester-initiated request into an event database 291, which may reside in the storage area 206. The communication event logger may reside on the system enabling the integrations of the various channels to automatically capture the events of interest. There could also be manual logging of events by the fulfiller to capture the channels of communications that do not happen through the provided integrations. The computer 200 accesses these events 280, 282, and, based on the event data, sends display region updates to a display 210 to produce a timeline 300.

FIG. 3 is an example timeline diagram mapping a request and resolution that may be presented on a display 210 of the user interface of the computing device 200 described above. The timeline 300 comprises an actual horizontal line (timeline axis) 305 representing a time flow. The timeline axis may actually be in any orientation, but for the sake of simplicity, will be described as being horizontal. One of ordinary skill in the art will understand how to apply the teachings herein for different orientations of the timeline axis 305. The timeline 300 is divided axially between requester event indicia or indications 310 below the line 305 that relate to a requester or customer 360, and fulfiller event indicia or indications above the line 305 that relate to a fulfiller or agent 370. For example, these event indicia can be in the form of vertical ticks 330.1 above the timeline axis 305 that represent the activities initiated by a fulfiller 370, and vertical ticks 330.2 below the timeline axis 305 that represent those activities initiated by a requestor (above-330.1 and below-line 330.2 ticks may be referred to collectively or individually by way of example be referred to as 330). The ticks are preferably of a minimal pixel width that can still be readily seen on the display. As shown in FIG. 3, a time summary 365 for the customer 36 and a time summary 375 for the agent 370 are provided. A legend 350 may also be provided for the timeline.

A request can be initiated by a requester 360 through various communication activities that include, but are not limited to, a phone call, a comment, an email, or a web page interaction. Any communication mechanism may be used to initiate the request. Various status markers (state indicia) may be utilized on the timeline. For example, referring to FIG. 4A, which is an implementation of a timeline diagram mapping an open request, a first state indicator 380.1 can illustrate an initiation status in a state of new. A second state indicator 380.2 can indicate a status of open, a third state indicator 380.3 can indicate a status of "in work". FIG. 4B is a similar timeline 300 to that shown in FIG. 4A, except that it is a closed item and has a fourth state indicator 380.4 as a closed status indicator (the state indicia 380.1-4 can be collectively or individually by way of example referred to herein as 380). As is illustrated in FIGS. 4A and 4B, a user can hover a pointer over a tick mark 330, or (see FIG. 4C) over a state indicator 380 to display a popover window or other display mechanism that provides additional informational details related to the underlying tick mark 330 or state indicator 380. The tick mark 330 or state indicator 380 could also be a selectable hyperlink to further information, or, text within the display mechanism 385 could contain a hyperlink to further information. In an implementation, the popover window can contain hyperlinks to information about Joe User, the customer, the related email, or other relevant information.

The status markers or state indicators 380 represent various stages described above (open, work-in-progress, close, etc.). However, these are just examples of possible stages for a generic incoming request, and they are customizable based on the particular use-case and the type of the request (e.g., Incident, Problem, Change, Case, etc.). For a generic incoming request, the following statuses are provided with example and non-limiting descriptions: 1) open—the request has been received and accepted by a fulfiller; 2) work in progress—the fulfiller is actively working on the request in this stage; 3) close—after the solution provided by fulfiller satisfies the requestor, the request can be marked as close. The state indicators 380 of a request's progression on the timeline are shown, which may or may not relate specifically to the requester 360 or the fulfiller 370. These markers or images are shown as circles, but they can be any form of graphical image or icon capable of conveying the state, status, or stage information relevant to the request and its progress. Furthermore, additional and/or more specialized states can be customized as well.

In an implementation, although not illustrated in the FIGs., timeline axis 305 color may be used to represent various key performance indicators (KPIs) or metrics being breached and how close they are to being breached. For example, if an SLA is breached, the timeline axis 305 could change from BLACK to RED from the point of the breach to the end of resolution. Similarly, color could be used for any of the tick marks 330, status indicators 380, or other display mechanisms 385 for indicating other attributes.

The data illustrated on the timeline 300 can be any metric data that represent various KPIs that can be derived as the request progresses. For example, as illustrated above, this data can be a summary of time spent on request by fulfiller on top to time spent by requestor on bottom. Metric data may be shown on the right-hand side of timeline, but can also be displayed at any location or graphical region on the display device.

Figure 5:
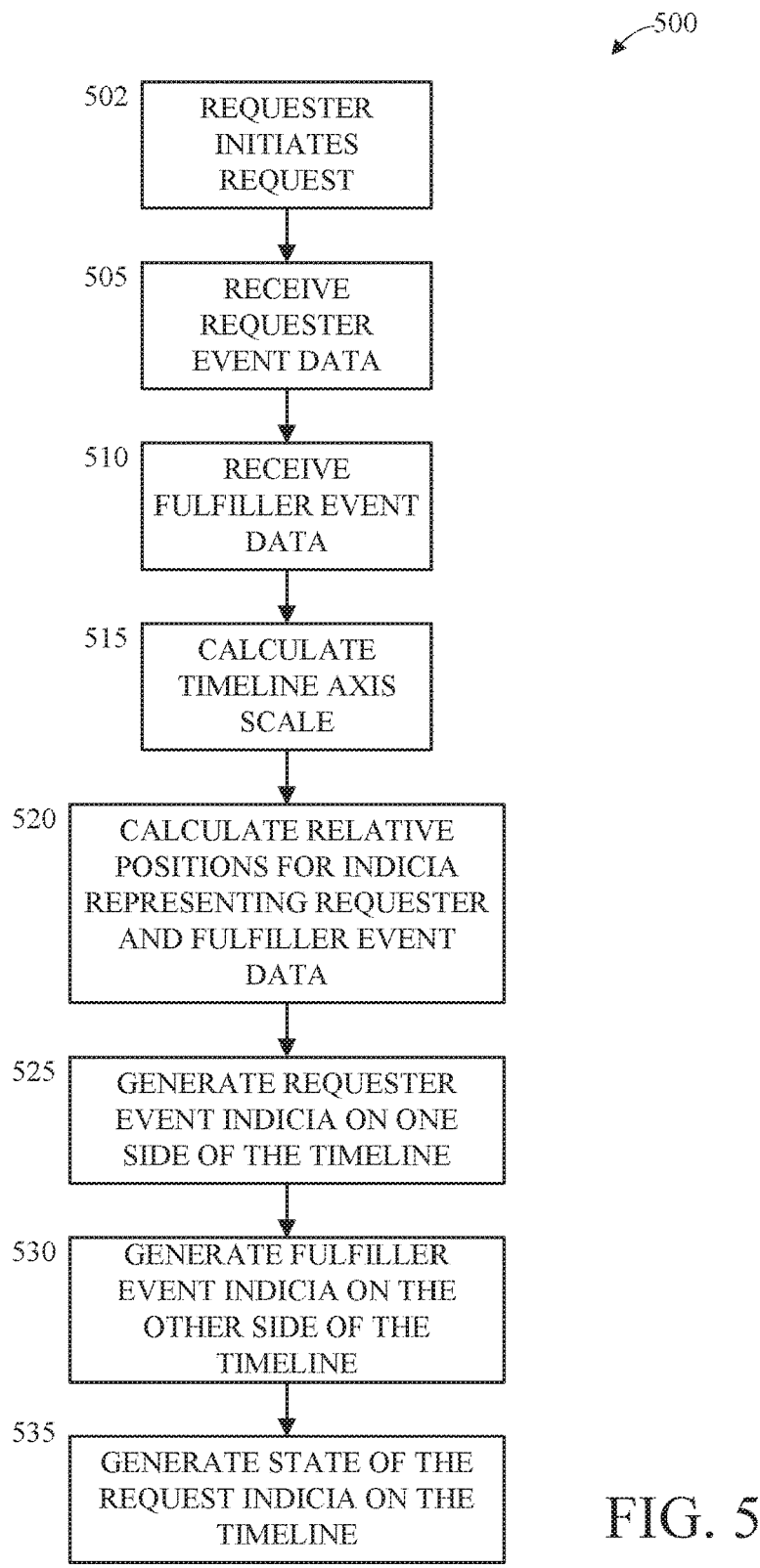
FIG. 5 is a flowchart according to an implementation of a timeline diagram mapping routine.

FIG. 5 is a flowchart according to an implementation of a timeline diagram mapping routine used to create the display discussed in detail above. According to the routine 500, the requester initiates the request 502 in a manner described above, and then subsequently, requester event data is received 505 and fulfiller event data is received 510. At some point, (e.g., when the request is being reviewed by the fulfiller or an interested party), the timeline may be displayed on a display device. The routine then calculates the timeline axis scale 515, based on various factors discussed below. Once the appropriate timeline axis scale has been determined, the relative positions for indicia representing both requester and fulfiller event data are calculated 520. The requester event indicia is then generated according to the calculated position on one side of the timeline 525, and the fulfiller event indicia is generated according to the calculated position on the other side of the timeline 530. State of the request indicia is also generated on the timeline 535.

One implementation provides the concept of timeline scaling. This can be provided in a number of different ways. First, the timeline can be presented such that it fills substantially all of the display's graphical region in a particular direction, such as the width. The term "substantially" means that an allowance can be made for a border region or the like for aesthetic purposes. The display region can relate to the size of a window on a display device. By way of example, if the display's graphical region (not counting border regions that may be used for aesthetic purposes) is one thousand pixels, and the current timeline is ten days long, then the timeline is displayed in a manner such that each day is one hundred pixels. This scaling can be updated with each change in timeline length, such that the entire timeline can always be seen.

Another way of timeline scaling prevents displayed indicia collisions, i.e., display indicia overlapping with one another for a particular type of indicia (i.e., event indicia do not overlap other event indicia, and state indicia do not overlap other state indicia—as shown in the FIGs., it is acceptable if the tick marks 330 and the state indicators 380 overlap). If a particular time scale would result in either of these overlapping other like indicia, the time scale is adjusted so that these indicia do not overlap. The scale can be calculated based on the width of the respective indicia on the display in pixels, and the time separation between the indicia.

In addition to preventing overlapping, the scaling can be performed so that no two events are close enough together so that they cannot be easily individually selected, i.e., that there is a gap between them. For example, if it is determined that a five-pixel separation is the minimum separation for ease of selectability, and the closest two events are one minute apart, then the scaling would be performed so that two hundred minutes of the timeline are displayed in some selected region (which could be the region in which two closely-spaced events occur). Additionally, any mechanism for zooming and panning the timeline by an arbitrary amount may be provided using user interface elements such as a mouse wheel spin or a click-drag operation with a mouse. For example, two ten-pixel wide state markers 380, in order to maintain a five-pixel predefined minimum separation, must have their centers spaced fifteen pixels apart. If the two states are fifteen minutes apart, then a scale of one pixel per minute is calculated and that portion of the timeline is redrawn. When two events occur close enough in time (e.g., based on a threshold for a given scale)—including concurrent/simultaneous events—the ticks/event lines on the display may be grouped together as thicker lines, which can visually indicate to the user that there could be multiple of these events happening simultaneously or in close temporal proximity of one another. One way to provide further information on such grouped events may be for the user to hover over these grouped events and then the tooltip may display multiple communication details one below the other.

In another implementation, the system can calculate and provide a prediction of the completion of the request. This prediction can be based on situations where the individual elements that make up a resolution to the request can be determined or predicted, and times for completion of these elements can be established, such as by predefined standards or historical averages. Another situation may be where a prediction (or schedule) is based on Service Level Agreement (SLA) thresholds or rules which are calculated based on predefined rules in the system (e.g., priority, requestor premium status (such as a VIP requestor)). Such SLA rules are typically setup based on contractual obligations to the requestor.) Thus, in one example, if fulfilling a request is known to typically require Task A, Task B, and Task C, and each task takes one day to complete (e.g., known from historical averages), then the system could predict an overall completion time for fulfilling the request as being three days. The system could also take a degree of variance for a task into account and incorporate that into the calculations as well as the display itself (e.g., the variance being represented by the diameter of a circle on the timeline. Furthermore, once a prediction is made, an indication, such as color, could be used to show a variance between a predicted time and an actual time, highlighting where the actual time is exceeding a predicted time (e.g., by coloring in red).

However, instead of standards or historical averages, some other basis, such as contractual obligations, could be utilized for making the predictions. For example, for a particular request, an SLA requires a fulfilment/resolution time of nine hours. If there are three tasks, as in the example above, and they are equally apportioned, then the prediction mechanism allocates three hours for each task. However, the tasks do not have to be equally apportioned and calculations can be made that adjust the times, but preserves the relative ratios between the tasks. In this way, the desired end result is known and the intermediate tasks are calculated so that the necessary times for performing them can be determined and displayed. Variations between actual and calculated can be illustrated in a way described above.

All or a portion of implementations of the invention described herein can be implemented using a general-purpose computer/processor with a computer program that, when executed, carries out any of the respective techniques, algorithms and/or instructions described herein. In addition, or alternatively, for example, a special-purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special-purpose blocks as well. An example FPGA can be programmed based on a hardware definition language (HDL) design, such as VHSIC Hardware Description Language or Verilog.

The embodiments herein may be described in terms of functional block components and various processing steps. Such functional blocks may be realized by any number of hardware and/or software components that perform the specified functions. For example, the described embodiments may employ various integrated circuit components (e.g., memory elements, processing elements, logic elements, look-up tables, and the like) which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "including," or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system comprising:
one or more processors;
a memory storing instructions that, when executed by the one or more processors, are configured to cause the one or more processors to:
receive requester event data, from a requester device, for one or more requester events relating to a request;
receive fulfiller event data, from a fulfiller device, for one or more fulfiller events;
calculate a time scale for a timeline axis to be displayed on a display, wherein the timeline axis provides an axis used to display:
a first set of indicia corresponding to the one or more requester events; and
a second set of indicia corresponding to the one or more fulfiller events;
cause the timeline axis to be displayed on the display based at least in part on the time scale, wherein the first set of indicia is displayed on a requester side of the timeline axis, and wherein the second set of indicia is displayed on a fulfiller side of the timeline axis;
predict predictive events that are expected to occur but have not yet occurred based at least in part on predictive criteria; and
cause predictive indicia indicative of the predictive events to be displayed on the display.

2. The system of claim 1, wherein the predictive criteria comprises historical averages for completion of tasks corresponding to the predictive events.

3. The system of claim 1, wherein the predictive criteria comprises service level agreement rules.

4. The system of claim 3, wherein the service level agreement rules comprise a priority given to the request based on an account used to generate the request.

5. The system of claim 3, wherein the service level agreement rules comprise a timeliness requirement under a service level agreement.

6. The system of claim 1, wherein the request comprises a request for hardware, software, or a service, or any combination thereof.

7. The system of claim 1, wherein receiving the requester event data comprises receiving the request via a telephone call, an email, a chat application, a web form, or social media, or a combination thereof.

8. The system of claim 7, wherein receiving the requester event data comprises automatically capturing information in the request.

9. The system of claim 7, wherein receiving the requester event data comprises receiving manual entry of information about the request.

10. The system of claim 1, wherein the instructions are configured to cause the one or more processors to:

detect a pointer hovering over an indicia of the first set of indicia or the second set of indicia; and responsive to the hovering over the indicia, display additional information about an event associated with the indicia.

11. The system of claim 10, the additional information comprises a hyperlink to information about the event, the requester device, a user of the requesting device, or communications related to the request, or a combination thereof.

12. Non-transitory, computer-readable, and tangible medium storing instructions thereon that, when executed by a processor, are configured to cause the processor to:

receive event data for events relating to a request;

calculate a time scale for a timeline axis to be displayed on a display, wherein the timeline axis provides an axis used to display indicia corresponding to the event data;

cause the timeline axis to be displayed on the display based at least in part on the time scale;

cause the indicia on the timeline axis to be displayed on the display;

predict predictive events that are expected to occur but have not yet occurred based at least in part on predictive criteria; and cause predictive indicia indicative of the predictive events to be displayed on the display.

13. The non-transitory, computer-readable, and tangible medium of claim 12, wherein the indicia comprises a graphical indicator of a state of the request.

14. The non-transitory, computer-readable, and tangible medium of claim 13, wherein the state comprises an open state, a work-in-progress state, a problem state, a change stage, or a closed state.

15. The non-transitory, computer-readable, and tangible medium of claim 12, wherein the indicia comprises a plurality of state indicators, and wherein calculating the time scale comprises evenly distributing the plurality of state indicators on the timeline axis.

16. The non-transitory, computer-readable, and tangible medium of claim 12, wherein calculating the time scale comprises setting a predefined distance as a minimum separation between any two displayed event indicia of the indicia.

17. The non-transitory, computer-readable medium, and tangible medium of claim 12, wherein calculating the time scale comprises setting a predefined distance as a minimum separation between any two displayed state indicia of the indicia.

18. The non-transitory, computer-readable medium, and tangible medium of claim 12, wherein calculating the time scale comprises calculating of the time scale setting a first predefined distance as a minimum separation between any two displayed event indicia of the indicia, and a second predefined distance is a minimum separation between any two displayed state indicia of the indicia.

19. The non-transitory, computer-readable medium, and tangible medium of claim 12, wherein calculating the time scale comprises:

calculating a scale size to a size to fit all events in window having a set size; and determining that resizing is to occur; and responsive to determining that resizing is to occur, spanning the timeline axis outside of the window and enable panning to browse the timeline axis.

20. The non-transitory, computer-readable medium, and tangible medium of claim 19, wherein determining that resizing is to occur comprises determining that indicia are closer together than a threshold distance, or receiving a selection of a zoom option.

21. The non-transitory, computer-readable medium, and tangible medium of claim 12, wherein predicting predictive events comprises determining whether key performance indicators or metrics are predicted to be breached, and wherein the instructions are configured to cause the processor to change a status indicator responsive to the determination that the key performance indicators or metrics are predicted to be breached.

22. The non-transitory, computer-readable medium, and tangible medium of claim 21, wherein changing the status indicator comprises changing a color of the timeline axis, a color of the indicia, or rendering a new status indicator.

* * * * *